United States Patent
Kaufmann et al.

(10) Patent No.: US 9,205,360 B2
(45) Date of Patent: Dec. 8, 2015

(54) FILTER ELEMENT AND HOUSING FOR A FILTER ELEMENT

(75) Inventors: Michael Kaufmann, Meckenheim (DE); Klaus-Dieter Ruhland, Meckenheim (DE)

(73) Assignee: Mann + Hummel GmbH, Ludwigsburg (DE)

( * ) Notice: Subject to any disclaimer, the term of this patent is extended or adjusted under 35 U.S.C. 154(b) by 489 days.

(21) Appl. No.: 13/525,150

(22) Filed: Jun. 15, 2012

(65) Prior Publication Data

US 2012/0317943 A1 Dec. 20, 2012

(30) Foreign Application Priority Data

Jun. 15, 2011 (DE) ............ 10 2011 106 500
Apr. 27, 2012 (DE) ............ 10 2012 008 453

(51) Int. Cl.
| | | |
|---|---|---|
| B01D 29/13 | (2006.01) | |
| B01D 35/30 | (2006.01) | |
| B23P 11/00 | (2006.01) | |
| B01D 46/24 | (2006.01) | |
| B01D 46/00 | (2006.01) | |

(52) U.S. Cl.
CPC ........ B01D 46/2411 (2013.01); B01D 46/0005 (2013.01); *B01D 2265/02* (2013.01); *B01D 2265/021* (2013.01); *Y10T 29/49826* (2015.01)

(58) Field of Classification Search
CPC ............ B01D 46/005; B01D 46/0005; B01D 46/2411; B01D 2265/02; B01D 2265/021
USPC .................... 55/492, 507, 509, 510
See application file for complete search history.

(56) References Cited

U.S. PATENT DOCUMENTS

| | | | | |
|---|---|---|---|---|
| 3,231,089 | A | * | 1/1966 | Thornton .............. 210/130 |
| 4,278,455 | A | * | 7/1981 | Nardi .................. 55/337 |
| 4,304,580 | A | * | 12/1981 | Gehl et al. ............ 55/482 |
| 4,443,237 | A | * | 4/1984 | Ulvestad ............... 55/379 |
| 4,735,638 | A | * | 4/1988 | Ciliberti et al. ........ 55/302 |
| 5,066,318 | A | * | 11/1991 | McDonough .......... 55/502 |
| 5,071,456 | A | * | 12/1991 | Binder et al. .......... 55/502 |
| RE36,129 | E | * | 3/1999 | Buonpastore .......... 55/498 |
| 6,093,237 | A | * | 7/2000 | Keller et al. .......... 95/287 |
| 6,663,685 | B2 | * | 12/2003 | Wright et al. ......... 55/507 |
| 6,706,087 | B1 | * | 3/2004 | Gebler et al. ......... 55/492 |
| 6,936,192 | B2 | | 8/2005 | Bauman et al. |
| 7,059,481 | B2 | * | 6/2006 | Kochert et al. ........ 210/437 |
| 7,090,708 | B2 | * | 8/2006 | Winter et al. ......... 55/357 |
| 7,191,903 | B2 | | 3/2007 | Amesoeder |
| 7,267,706 | B2 | * | 9/2007 | Schaerlund et al. .... 55/492 |
| 7,513,925 | B2 | * | 4/2009 | Thomas et al. ........ 55/502 |
| 8,388,713 | B2 | * | 3/2013 | Enderich et al. ....... 55/313 |
| 8,523,973 | B2 | * | 9/2013 | Ackermann et al. .... 55/498 |

(Continued)

FOREIGN PATENT DOCUMENTS

| | | |
|---|---|---|
| DE | 202008015438 U1 | 4/2010 |
| EP | 1789159 A1 | 5/2007 |

*Primary Examiner* — Amber Orlando
*Assistant Examiner* — Britanny Precht
(74) *Attorney, Agent, or Firm* — James Hasselbeck

(57) ABSTRACT

A filter element, in particular an air filter element, for a detachable insertion into a housing with a detachable housing cover is provided. The air filter element has a tubular support structure, at which a filter medium is disposed. A coupling section couples with a clamping device, clamping the filter element in the housing. The coupling section includes a fixing element blocking a rotation of the coupling section or the support structure in relation to the clamping device.

7 Claims, 8 Drawing Sheets

(56) References Cited

U.S. PATENT DOCUMENTS

| | | | |
|---|---|---|---|
| 2004/0250518 A1* | 12/2004 | Kao | 55/379 |
| 2008/0066435 A1* | 3/2008 | Engel et al. | 55/492 |
| 2011/0036242 A1* | 2/2011 | Enderich et al. | 96/400 |
| 2011/0258975 A1* | 10/2011 | Lundgren et al. | 55/357 |
| 2011/0259199 A1 | 10/2011 | Blossey et al. | |
| 2012/0128510 A1* | 5/2012 | Minola | 417/313 |
| 2012/0216497 A1* | 8/2012 | Dworatzek et al. | 55/492 |
| 2012/0324849 A1* | 12/2012 | Ackermann et al. | 55/492 |
| 2014/0102058 A1* | 4/2014 | Kaufmann et al. | 55/482 |

* cited by examiner

FILTER ELEMENT AND HOUSING FOR A FILTER ELEMENT

CROSS REFERENCE TO RELATED APPLICATIONS

This application claims the benefit under 35 USC 119 of foreign application 102011106500.1 filed in Germany on Jun. 15, 2011, and which is hereby incorporated by reference in its entirety. This application further claims the benefit under 35 USC 119 of foreign application 102012008453.6 filed in Germany on Apr. 27, 2012, and which is hereby incorporated by reference in its entirety.

TECHNICAL FIELD

The present invention relates to a filter element that can be used for filtering air, as well as to housing for the filter element. In particular, the invention relates to an air-filter element, a housing for an air-filter element and a filter assembly.

BACKGROUND OF THE INVENTION

Filter elements are used for filtering fluid flows or gaseous media. They are, for example, used for filtering an air flow that is guided into the passenger compartment of a motor vehicle. In this connection, an air-conditioning system built into the motor vehicle is in particular used to purify the outdoor air with respect to noxious substances, odors, etc., contained therein. In this context, appropriate filters or cabin air filters, respectively, are, for example, particle filters, odor filters or a combination thereof.

Furthermore, it is necessary to eliminate suspended matters from air that is supplied to an internal combustion engine. Such air filters, for example for trucks, construction machines, agricultural machines or even marine engines must be designed reliably and robustly, for they are exposed to extreme mechanical load during operation.

Filters are typically provided with a housing with a detachable housing cover, wherein a replaceable filter element can be mounted into the housing. Usually, the filter element has a tubular design and is fixed in the housing when the filter element is mounted into the housing.

DE 20 2007 002 906 U1 discloses a filter assembly in which a filter element is clamped by means of support knobs made of foam of polyurethane (PU), also called PUR foam, in a housing for the filter element.

However, the foam of polyurethane, i. e. the material of the support knobs, is released after heat storage (artificial storage) or temperature impact, respectively, or temperature change. In other words, the foam of polyurethane is force-free after heat storage. With the filter element held in the housing this leads again and again to the fact that in case of vibration excitation of the filter assembly and its parts, that is to say housing, filter element and housing cover, greater critical movements between individual parts occur. Such a vibration excitation may, for example, occur during the operation of a motor vehicle into which the filter assembly is built in.

EP 1 716 902 A discloses a filter assembly with a housing into which between housing and replaceable filter insert a spiral spring for clamping the filter insert is disposed.

SUMMARY OF THE INVENTION

An object of the invention is to create an improved filter element and an improved housing for the filter element.

Accordingly, a filter element for a detachable insertion into a housing with a detachable housing cover is provided. The air-filter element features a tubular support structure where a filter medium is disposed. At one front side of the tubular support structure is a coupling section disposed that is designed to be coupled with a clamping device for clamping the air filter element between a housing body and the housing cover, wherein the coupling section comprises a fixing element for blocking a rotation of the coupling section and/or the support structure in relation to the clamping device when the air filter element is installed detachably in the housing.

The filter element is preferably an air-filter element, for example for filtering combustion air for an internal combustion engine.

The suggested filter element is of simple construction and can be manufactured in a cost-efficient way. The design of the coupling section ensures at the same time that the clamping of the filter element in the housing does not become force-free even with heat storage. Furthermore, tolerances between filter element and housing can be compensated. Furthermore, the filter element is secured against torsion in relation to the housing. As a result, a safe seat of the filter element in the housing is realized also in case of vibration excitation. Furthermore, it is for example also ensured by the design of the coupling section that the clamping firmly holds a weight of the filter element loaded with particles.

In embodiments of the filter element, the same is exclusively pluggably connectable with the housing or the seal seat, respectively. As a result, mounting and/or dismounting is simplified and time-consuming bayonet or screwed connections are avoided.

Preferably, the shape of the fixing element is adapted to the shape of the clamping device. In this way, an especially twist-proof clamping of the filter element in the housing can be achieved.

It is possible that the coupling section features as fixing elements projections between which one leaf spring each of the clamping device can be accommodated which has at least two pair-wise opposing leaf springs which are disposed at the outer circumference of a disk. In this connection, the projections can have the shape of a prism.

Alternatively or additionally it is possible that the coupling section features radially extending recesses into which one leaf spring each of the clamping device can be accommodated which has at least two pair-wise opposing leaf springs which are disposed at the outer circumference of a disk.

Alternatively or additionally the accommodating device can also be a curved, in particular circularly curved disk that is curved towards the outside with respect to the end face of the tubular support structure. This has the advantage that the clamping device in the housing cover can cover a larger area and thus offers outside of the spring area of the clamping device small support areas for the filter element.

With the latter alternative it is also possible that the coupling section as fixing element features a projection that can be accommodated in a hole of a disk of the clamping device which is a disk spring.

Accordingly, a housing or a filter seat for a detachably mountable filter element for filtering air is provided. The housing has a detachable housing cover and a clamping device that is designed to clamp the air filter element between a housing body and the housing cover, wherein the clamping device is designed in such a way that it can be coupled with a coupling section of the air-filter element that is disposed at the end face of a tubular support structure of the air-filter element, for clamping the air-filter element in the direction of a longitudinal axis of the tubular support structure, and that the clamping device cooperates with a fixing element of the coupling section for blocking a rotation of the coupling section and/or the support structure in relation to the clamping device when the air filter element is installed detachably in the housing.

Preferably, the shape of the clamping device is adapted to the shape of the fixing element.

It is possible that the clamping device has a disk at the outer circumference of which at least two pair-wise opposing leaf springs are disposed.

Alternatively, the clamping device can be a disk spring.

The clamping device can be made of metal. As a result, the disadvantage of PUR knobs as clamping means that can become force-free at higher temperatures is eliminated.

In an alternative embodiment, the coupling section described in connection with the filter element can be provided at the housing cover and accordingly, the clamping device described in connection with the housing can be provided at the filter element and in particular connected undetachably thereto.

The previously described housing and the previously described filter element which is inserted into the housing can form a filter assembly.

The invention relates furthermore to a method for mounting an air-filter element, in particular according to the invention, into an air-filter housing in particular according to the invention, wherein in a first step the filter element is inserted into a first housing component, wherein in particular a seal of the filter element engages with a seal seat of the housing, wherein in a second step the housing is closed by means of a second housing component, for example a cover, wherein the second housing component is connected with the first housing component and a clamping device is clamped between the second housing component and the filter element, in particular between the second housing component and a frontal end of the filter element, for example an end plate or a tubular support structure. In doing so, the filter element is clamped in the direction of the seal seat and in particular engages with a corresponding coupling section for blocking a rotation.

The invention relates furthermore to a process for changing an air-filter element, wherein the housing is opened, a filter element is removed and finally a filter element according to the previously described steps is inserted.

Further possible implementations of the invention comprise also not explicitly mentioned combinations of characteristics or embodiments described previously or in the following with respect to the examples of an embodiment. In this context, the person of skill in the art will add also individual aspects as improvements or complements to the respective basic form of the invention.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

In the figures, identical or functionally similar elements have the same reference numerals, unless otherwise stated.

Figure 1:
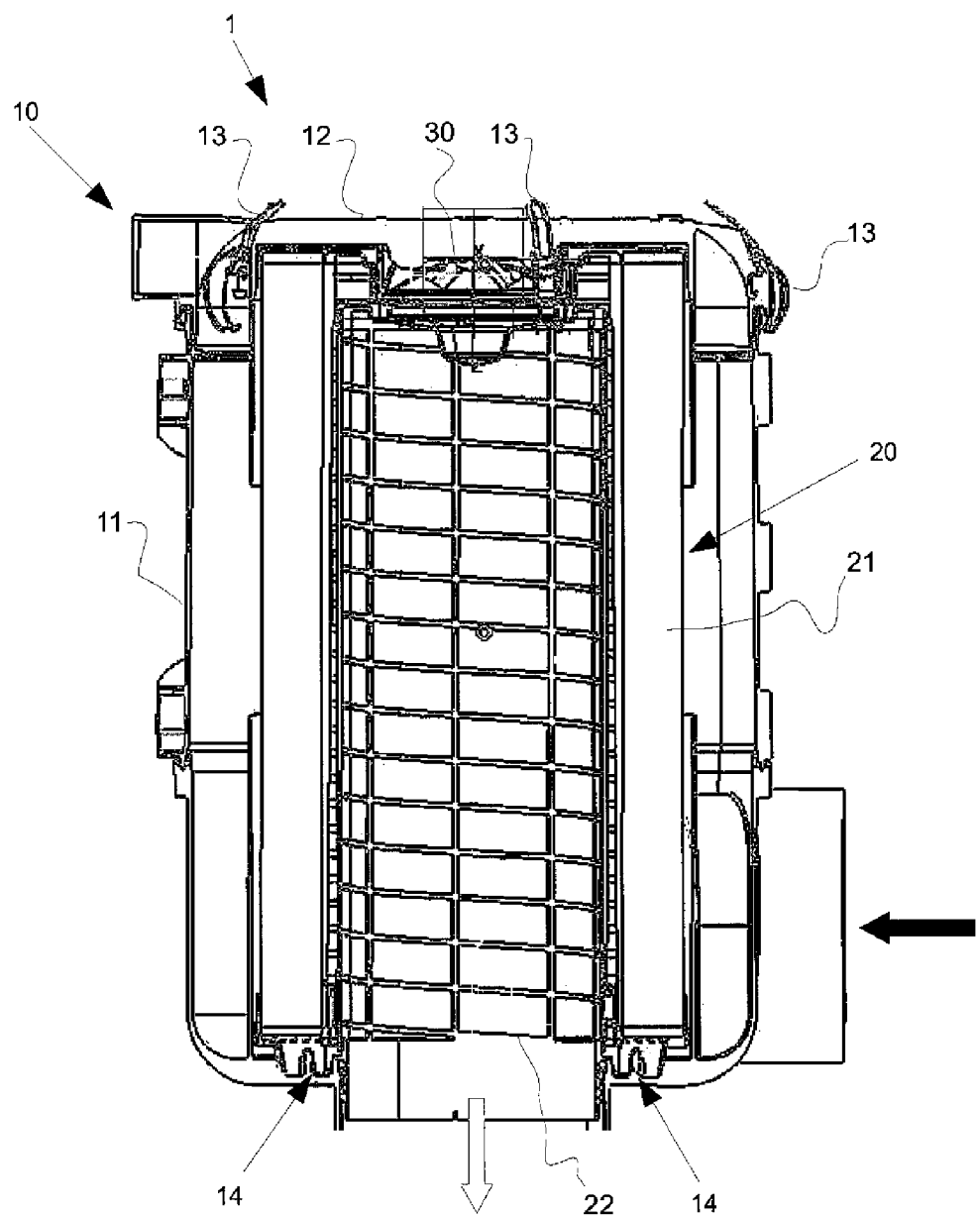
FIG. 1 is a sectional view of an air filter into which a filter element according to a first example of an embodiment is detachably mounted.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to a filter element and a housing for the filter element. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

In the following, the invention is described with reference to a filter for the combustion air of an internal combustion engine, for example a motor vehicle. Instead for filtering air, corresponding filter elements can be designed for filtering, for example, another gaseous or even liquid medium, such as, for example, oil.

Figure 2:
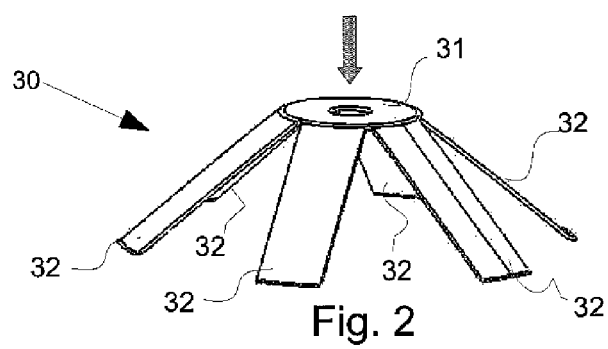
FIG. 2 is a three-dimensional view of a clamping device of the air filter according to the first example of an embodiment.

As shown in FIG. 1, the filter 1 comprises according to the first example of an embodiment a housing 10 with a housing body 11 and a detachable housing cover 12 which in this case is held by means of clamps 13 at the housing body 11. In a seal seat 14 of the housing 10, more precisely of the housing body 11, a filter element 20 is built in detachably. In the flow direction illustrated by the black block arrow raw air, unpurified air, can be introduced into the housing 10. The raw air enters into contact with the filter element 20 which filters impurities from the raw air. Air cleaned from impurities, the purified air, can be discharged from the housing 10 in the direction indicated by the white block arrow. For filtering the air, the filter element 20 has a filter medium 21 that is laid around and/or arrange on an outer surface of an airflow permeable tubular support structure 22. That is, the filtering element 21 is disposed at the outer surface or outside wall of the tubular support structure 22. The tubular support structure 22 has a grid-shaped tube wall with opening permitting fluid flow there through. The tubular support structure 22 is designed as tube or central tube, respectively. A clamping device 30 that is enlarged in FIG. 2 is disposed between housing cover 12 and tubular support structure 22. The filter element 20 in the housing 10 can be clamped axially and radially by means of the clamping device 30. In this connection, the filter element 20 is clamped in the housing 10 between housing cover and the seal seat 14 for the filter element 20 and fixed in this way.

FIG. 1 shows the case where the housing cover 12 is attached to the housing body 11 by means of the clamps 13. For assembly or mounting, respectively, or for disassembly or dismounting, respectively, of the filter element 20, the clamps 13 can be loosened from their clamping to the housing body 11 and the housing cover 12 so that the housing cover 12 can be removed from the housing body 11. In this state, the filter element 20 can be inserted into the open housing 10 or removed. After that, the housing cover 12 can again be attached by means of the clamps 13 to the housing body 11.

FIG. 2 illustrates the shape of the clamping device 30 according to this example of an embodiment. The clamping device 30 has an annular disk 31 which has, for example, six leaf springs secured to and extending outwardly from the annular disk. The clamping device may have any number of leaf springs. The leaf springs are deflectable as a spring fashion to transmit pressure or force through the clamping device. The leaf springs 32 are more or less rectangular each and are attached with their narrow side of the rectangle to the disk 31. Two leaf springs 32 each are directly located opposite each other at the disk 31. That is, the leaf springs 32 are disposed pair-wise at the disk 31. If a pressure or force is exerted on the clamping device 30 in the direction of the gray block arrow in FIG. 2, the leaf springs 32 spread more apart than shown in FIG. 2. In this case, the clamping device 30 exerts a pressure or force on its support. In this example of an embodiment, the clamping device 30 is made of metal, in particular of spring steel.

Figure 3:
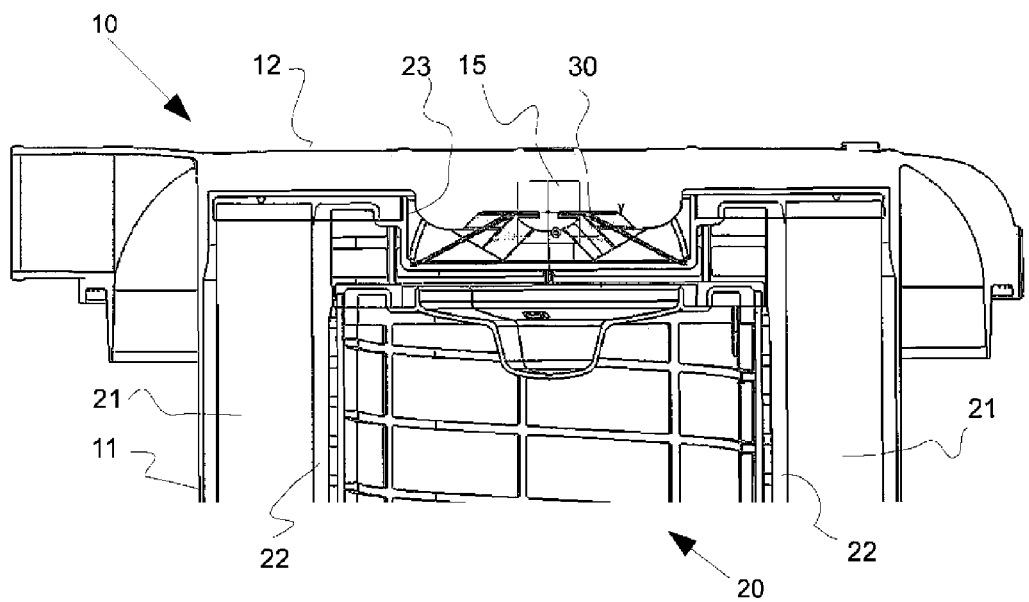
FIG. 3 is an enlarged detail view of the sectional view of the air filter of FIG. 1.
Figure 4:
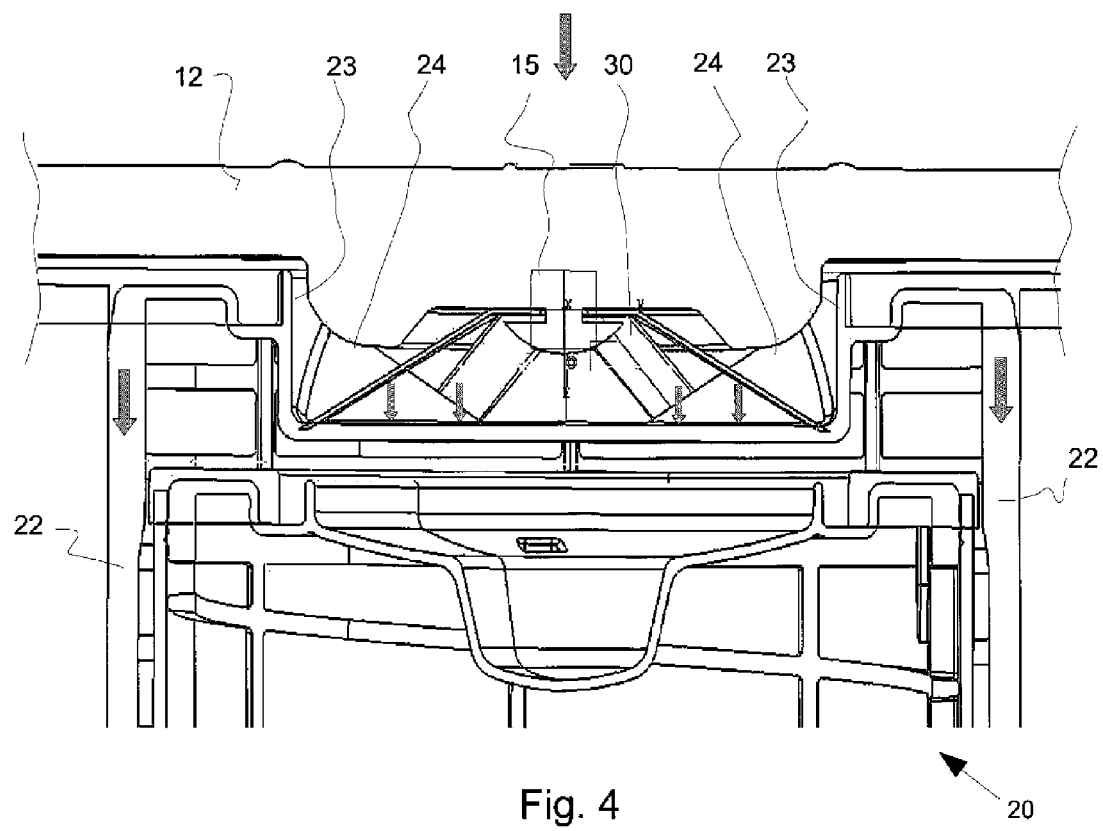
FIG. 4 is a further enlarged detail view of the sectional view of the air filter of FIG. 1.

FIGS. 3 and 4 show the assembly location of the clamping device 30 in the housing cover 12 more in detail. The clamping device 30 is attached to the housing cover 12 by means of an interlocking device 15. As can be best seen in FIG. 4, to achieve this, the interlocking device 15 engages into the hole in the center of the annular disk 31 (FIG. 2). Now, if the housing cover 12 is mounted with the clamping device 30 at the housing body 10, wherein the filter element 20 is accommodated in the housing 10, as shown in FIG. 2 to FIG. 4, the clamping device 30 is then mounted in a coupling section 23 of the pipe 22. The coupling section 23 is disposed at the pipe end or the end face, respectively, of the tubular support structure 22, the pipe end or the end face, respectively, facing the housing cover 12 if the filter element 20 is correctly mounted in the housing 10. The housing 10 and the filter element 20 have such dimensions that the clamping device 30 exerts pressure on the accommodating device 23 when the housing cover 12 is closed and the housing is built into the filter element 20. In this connection, the coupling section 23 is shaped as indentation or recess, respectively. In this way, the coupling section 23 is designed in such a way that it can absorb the pressure of the clamping device 30 in axial direction of the filter element 20 and furthermore exert a counter-pressure on the clamping device 30. The pressure is distributed in the pipe 22 along the flow of forces that is specified in FIG. 4 by gray block arrows. The accommodating device 23 can additionally feature projections 24 which are each disposed in the accommodating device 23 in such a way that one leaf spring 32 each is disposed between two projections 24. Each projection 24 is a fixing element 24 of the coupling section 23. The fixing element 24 blocks a rotation of the coupling section 23 and/or the tubular support structure 22 in relation to the clamping device 30 if the air-filter element 20 is mounted detachably into the housing 10.

Figure 16:
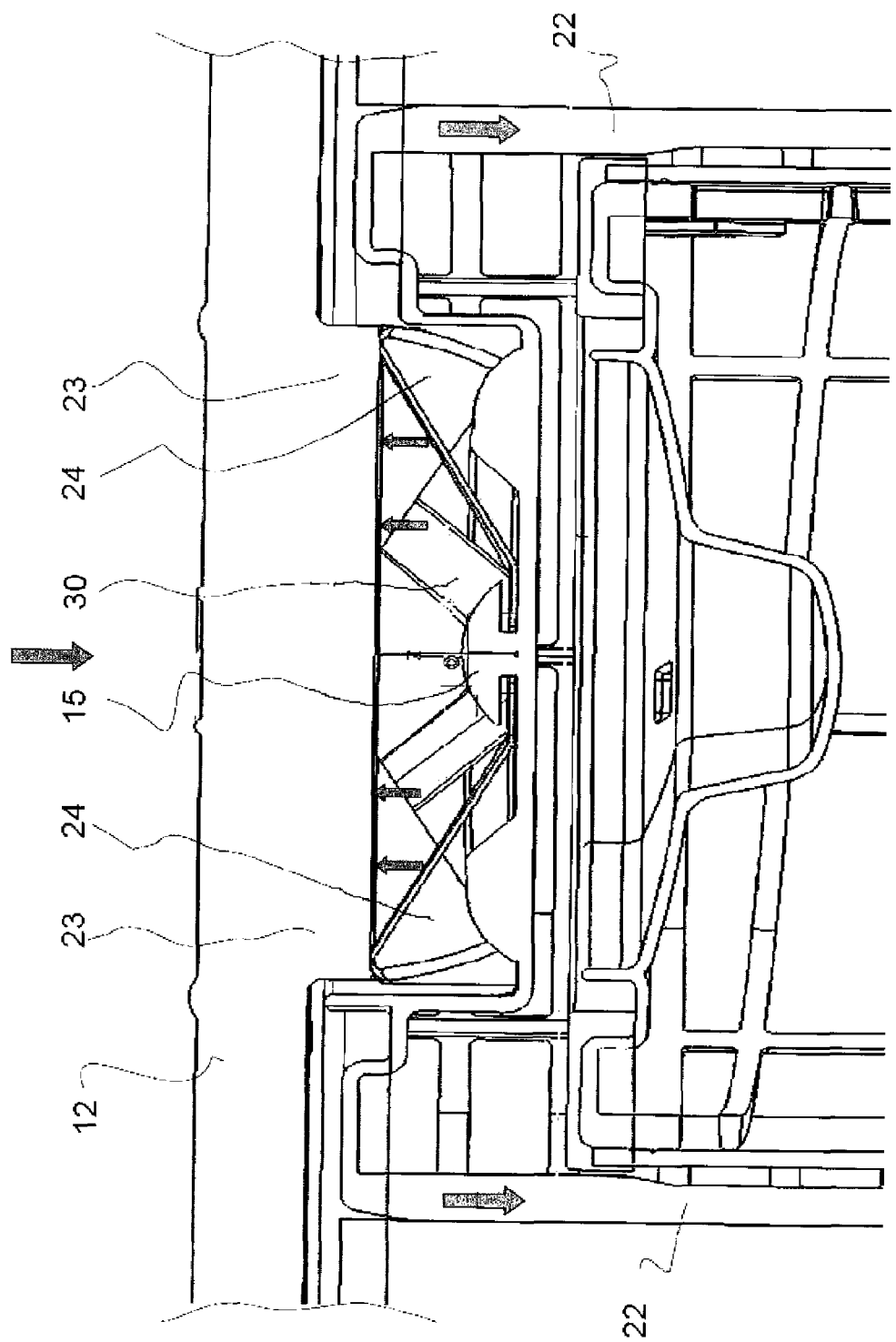
FIG. 16 is an enlarged detail view of the sectional view of a variant of an air filter in analogy to FIG. 4.

FIG. 16 shows in analogy to FIG. 4 a variant of a clamping device and a coupling device, wherein the clamping device disposed at the housing cover 12 in FIG. 4 is now attached to the filter element, in particular to its end plate or to the pipe 22. Accordingly, the coupling section already described on the side of the filter element 20 is provided in this variant at the housing cover 12. By the way, the elements can be designed in analogy to the other embodiments, accordingly, identical or functionally identical elements have the same reference numerals.

Figure 5:
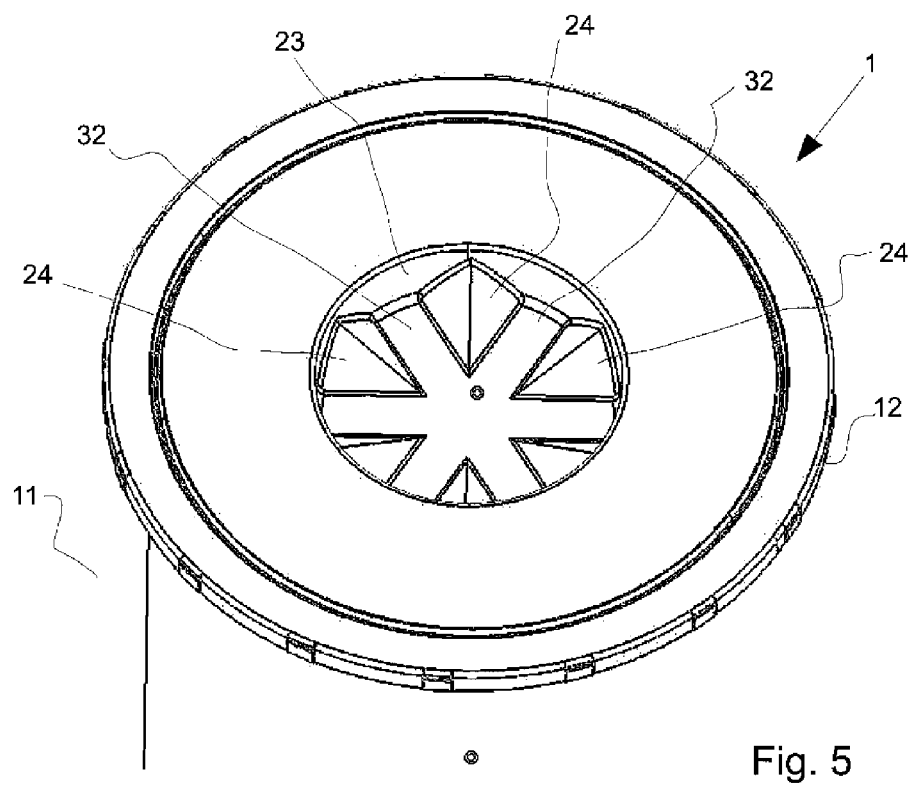
FIG. 5 is a three-dimensional top view onto a housing cover of a housing of the air filter of FIG. 1.

FIG. 5 illustrates more in detail the arrangement of the clamping device 30 relative to the projections 24 in the accommodating device 23 of the tubular support structure 22. FIG. 5 shows the case when the clamping device 30 does not exert any pressure on the wall of the coupling section 23 that is substantially disposed in axial direction of the filter element 20. In other words, the case is shown in which the clamping device 30 does not exert any radial pressure on the coupling section 23. For the sake of clarity not all projections 24 and leaf springs 32 of the clamping device 30 are provided with reference numerals in FIG. 5.

As shown in FIG. 5, the projections 24 are substantially designed in the shape of a prism. The bottom of the prisms of the projections 24 abuts against the wall of the coupling section 23 that is substantially disposed in axial direction of the filter element 20 and its tubular support structure 22. Between the projections 24, the coupling section 23 is designed in the shape of the leaf springs 32. That is, the coupling section 23 has there where the leaf springs 32 of the clamping device 30 are to be accommodated, a substantially plane surface, as shown in FIG. 3 and FIG. 4. The projections 24, therefore, form a supporting geometry for the clamping device 30 in the tubular support structure 22. The projections 24 serve to guide the leaf springs 32 or the clamping device 30, respectively, into the coupling section 23. The coupling section 23 or the fixing elements 24, respectively, and the clamping device 30 are adapted to fit together. In this way, they form a compatible or complementary system. The leaf springs 32 of the clamping device 30 and the projections 24 of the coupling section 23 complement each other in such a way that they form together a full circle.

All these embodiments ensure a reliable assembly of the filter element 20 in the housing, for, on the one hand, tolerances between housing 10 and filter element 20 can be compensated and, on the other hand, the necessary pressure of the filter element 20 in the seal seat 14 is generated (FIG. 1). The projections 24 can improve or realize, respectively, the torsional reliability of the installation of the filter element 20 into the housing 10.

Figure 6:
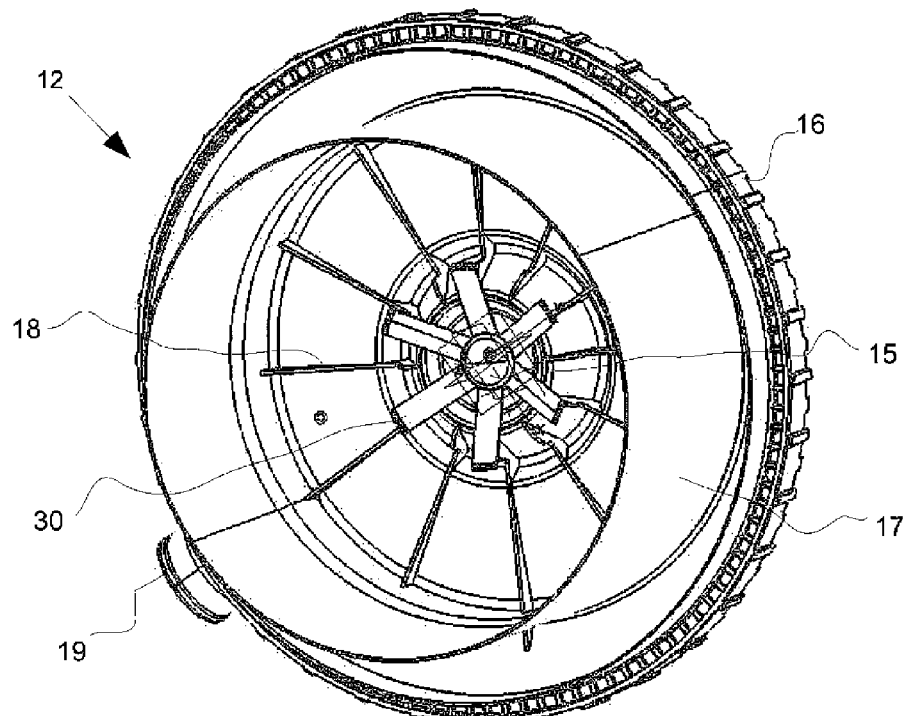
FIG. 6 is a three-dimensional bottom view under the housing cover of a housing of the air filter of FIG. 1.

FIG. 6 shows the housing cover 12 from below when the housing cover 12 is removed from the housing 10. In this case, the clamping device 30 attached to the housing cover 12 by means of the interlocking device 15 is visible. In addition, it can be recognized that the housing cover 12 features a mounting ring 16 at which the housing cover 12 can be held for mounting or dismounting. Furthermore, the housing cover 12 has a flange 17 which is inserted into the housing body 11 during mounting of the housing cover 12 at the housing body 11. Several reinforcing ribs 18 that serve to reinforce the housing cover 12 are attached inside to the cover plate of the housing cover 12. For the sake of clarity not all reinforcing ribs 18 are provided with reference numerals in FIG. 6. Furthermore, a connecting piece 19 is shown in FIG. 6 via which, for example, particles can be discharged from the housing 10 that could be, for example, separated from the raw air by means of a cyclone filtration.

As modification of the first example of an embodiment other geometries can also be used for the clamping device 30. For example, the clamping device 30 can also have the shape as shown in FIG. 7 to FIG. 9.

Figure 7:
FIG. 7 to FIG. 9 depicts schematic views of geometries of the clamping device according to modifications of the first example of an embodiment.

FIG. 7 shows a first modification of the clamping device 30 of the first example of an embodiment in a lateral view. The clamping device 30 is in this case very similar to the clamping device 30 of the first example of an embodiment.

Figure 8:
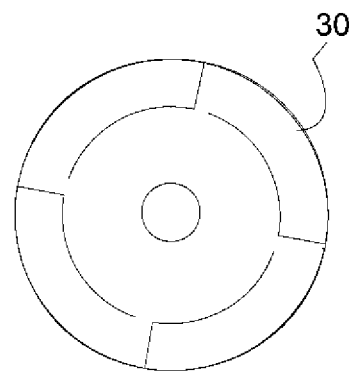

FIG. 8 shows a second modification of the clamping device 30 of the first example of an embodiment in a top view. With this modification there is no torsion of the filter element 20 in the housing 10 possible when the filter element 20 is installed in the housing 10, as shown in FIG. 1.

Figure 9:
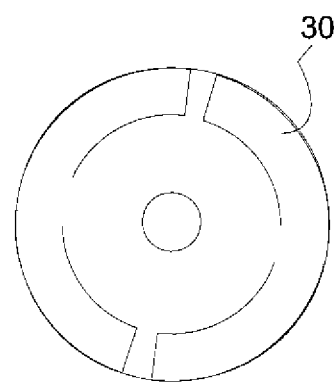

FIG. 9 shows a third modification of the clamping device 30 of the first example of an embodiment in a top view. With this modification, too, there is no torsion of the filter element 20 in the housing 10 possible when the filter element 20 is installed in the housing 10, as shown in FIG. 1.

The examples of the FIGS. 8 and 9 have a central opening each which can serve for the centering, and along the circumference flexible strips are provided as spring sheet strips The four spring sheet strips are, for example, bent from the plane of the sheet metal towards the bottom or the top and ensure an axial spring effect in the installed state. The corresponding clamping device can be cut out cost-efficiently of sheet metal and bent. Other geometries are, of course, conceivable.

Figure 10:
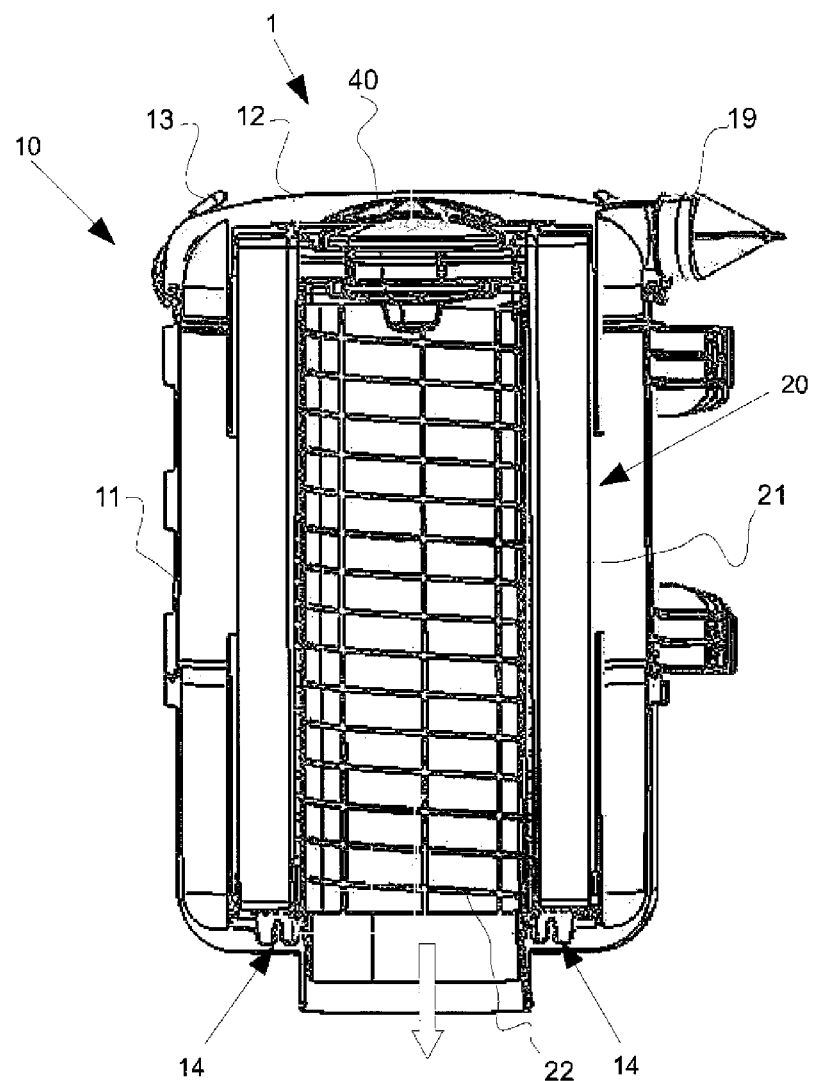
FIG. 10 is a sectional view of an air filter into which a filter element according to a second example of an embodiment is detachably mounted.

FIG. 10 shows a similar sectional view, as shown in FIG. 1, for explaining a second example of an embodiment of the filter element 20. The filter 1 and the filter element 20 of the second example of an embodiment are in many parts designed similarly to the filter 1 and the filter element 20 of the first example of an embodiment. In the following are, therefore, only described the differences between the first and the second example of an embodiment. Apart of that, reference is made to the description of the first example of an embodiment.

Figure 11:
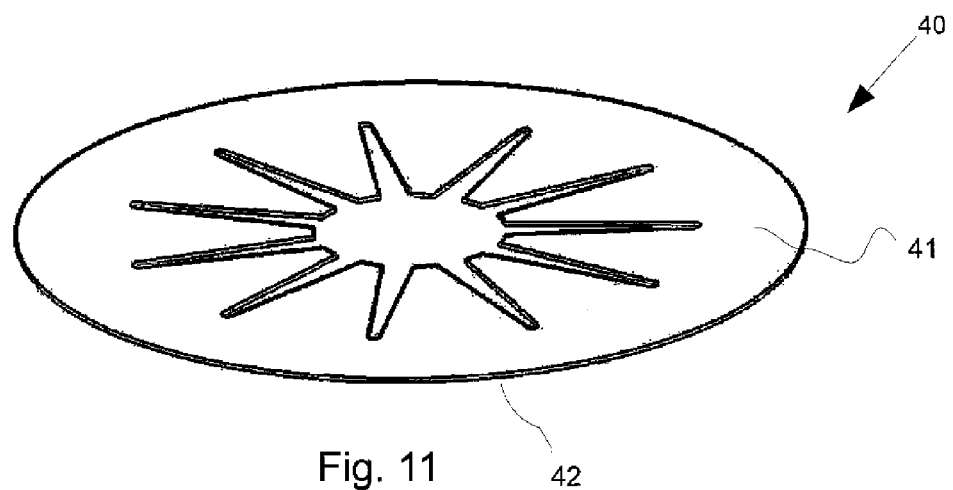
FIG. 11 is a three-dimensional view of a clamping device of the air filter according to the second example of an embodiment.

As shown in FIG. 10 and more in detail in FIG. 11, the housing cover 12 according to this example of an embodiment has in contrast to the first example of an embodiment a clamping device 40. The clamping device 40 is a disk spring. In this connection, the clamping device 40 is shaped as a disk 41 in which a hole 42 in the shape of a star is formed. In this example of an embodiment, the clamping device 40 is made of metal, in particular of spring steel.

Due to the other shape of the clamping device 40, the tubular support structure 22 has a coupling section 25 the shape of which differs from the coupling section 23 of the first example of an embodiment.

Figure 12:
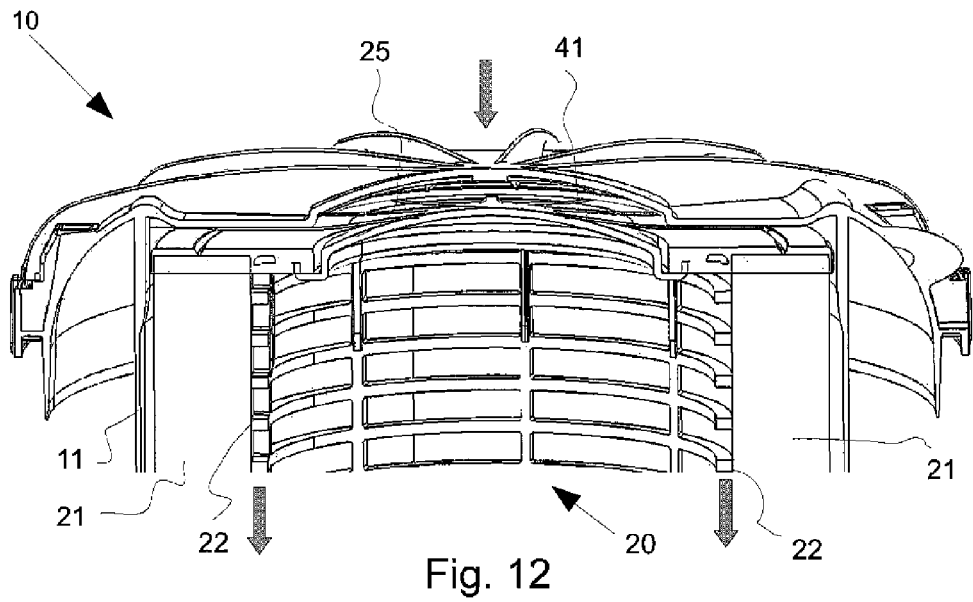
FIG. 12 is an enlarged detail view of the sectional view of the air filter of FIG. 10.
Figure 13:
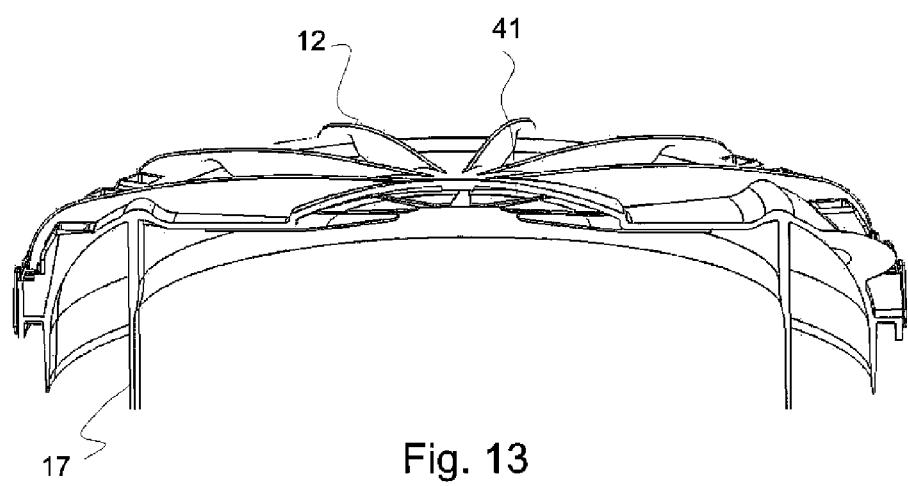
FIG. 13 is a detail view of the housing cover of the air filter of FIG. 10.

FIGS. 12 and 13 show the assembly location of the clamping device 40 in the housing cover 12 more in detail. The clamping device 40 is attached to the housing cover 12. As can be seen best in FIG. 13, the housing cover 12 has a round, in particular circular, opening under which the clamping device 40 is disposed inside of the housing cover 12. In this connection, the disk 41 (FIG. 11) has a larger diameter than the opening in the housing cover 12. Now, if the housing cover 12 is mounted with the clamping device 40 at the housing body 10, wherein the filter element 20 is accommodated in the housing 10, as shown in FIG. 10 and FIG. 12, the clamping device 40 is then mounted in the coupling section 25 of the tubular support structure 22. The coupling section 25 is disposed also in this example of an embodiment at the pipe end or the end face, respectively, of the tubular support structure 22, the pipe end or the end face, respectively, facing the housing cover 12 if the filter element 20 is correctly mounted in the housing 10. The housing 10 and the filter element 20 have such dimensions that the clamping device 40 exerts pressure on the coupling section 25 when the housing cover 12 is closed and the filter element 20 is built into the housing 10. In this connection, the coupling section 25 is shaped as curved disk or plate, respectively. The curvature of the disk of the coupling section 25 is in axial direction of the pipe 22 outwardly directed, as shown in FIG. 12. In this way, the coupling section 25 is designed in such a way that it can absorb the pressure of the clamping device 40 in axial direction of the filter element 20 and furthermore exert a counterpressure on the clamping device 40. The pressure is distributed in the pipe 22 along the flow of forces that is specified in FIG. 12 by gray block arrows.

Figure 14:
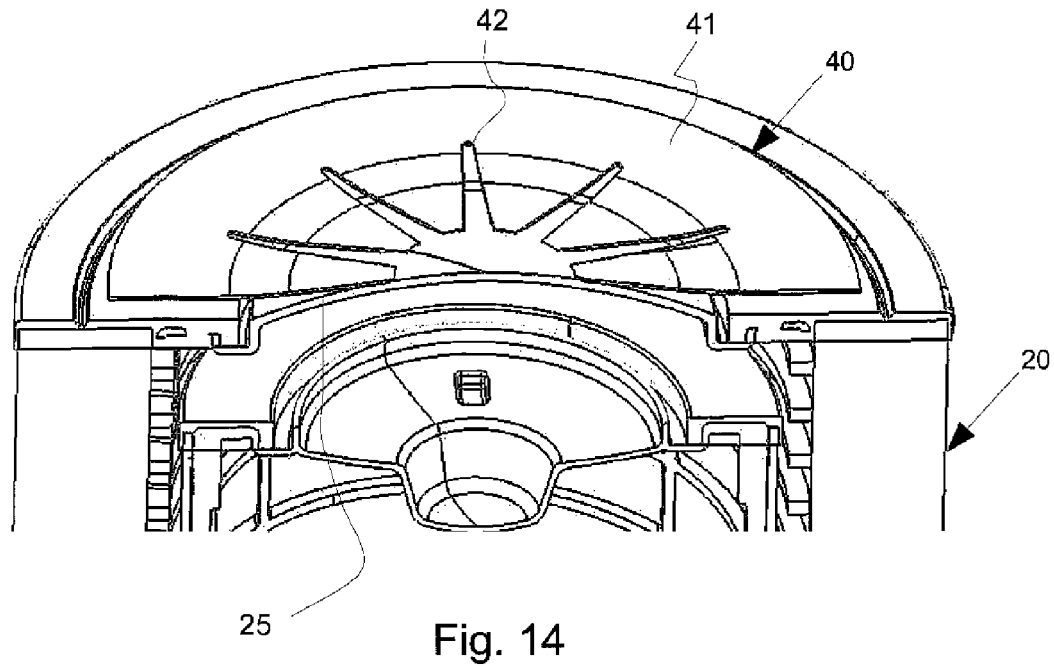
FIG. 14 is a three-dimensional top view of the filter element of FIG. 10 with clamping device.

FIG. 14 shows the case in which the clamping device 40 lies unclamped on the curved coupling section 25. As a result, the parts are in the center of the clamping device 40, i. e. in the area of the hole 42, in the plane of the disk 41 of the clamping device 40.

Figure 15:
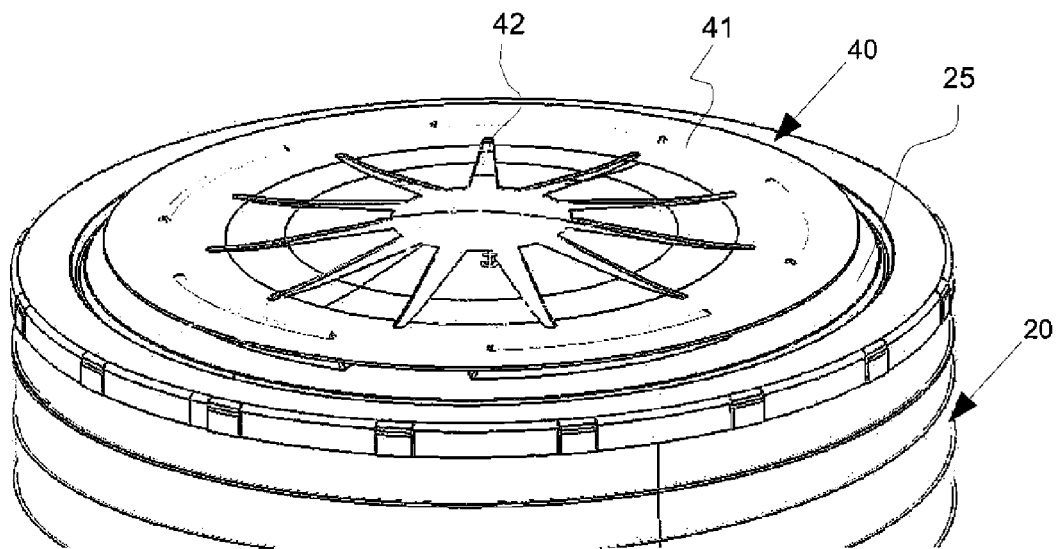
FIG. 15 is another three-dimensional top view of the filter element of FIG. 10 with clamping device.

FIG. 15 shows the case in which the clamping device 40 is pressed against the curved coupling section 25. As a result, the parts in the center of the clamping device 40, i. e. in the area of the hole 42, are bent by means of the curved coupling section 25 from the plane of the disk 41 of the clamping device 40. As a result, the clamping device 40 is clamped in the case shown in FIG. 15.

The system of clamping device 40 and curved coupling section 25 has the advantage that the clamping device 40 in the housing cover 12 can cover a larger area and thus offers outside of the spring area, of the hole 41 (FIG. 11), small support areas for the filter element 20.

Thus, in this example of an embodiment, too, the coupling section 23 and the clamping device 40 are adapted to fit together. In this way, they also form a compatible or complementary system.

All examples of an embodiment of the filter 1, the filter element 20 and the housing 10 described above can be used individually or in all possible combinations. In this connection, in particular the following modifications are conceivable.

Other geometries and dimensions as those shown and described can be chosen for the clamping device 30 and/or the coupling section 23 as far as the circumstances at the assembly location of the filter element 20 have to be taken into consideration and a detachable assembly of the filter element 20 in the housing 10 is possible, as described above.

The clamping device 30 and the coupling section 23 are preferably disposed centrally at the end face of the tubular support structure 22 or the filter element 20, respectively, as shown in the figures of the first example of an embodiment and its modifications. The clamping device 40 and the coupling section 25 also are preferably disposed centrally at the end face of the tubular support structure 22 or the filter element 20, respectively, as shown in the figures of the second example of an embodiment.

Instead of projections 24 in the first example of an embodiment the coupling section 23 can also feature radially extending recesses in which a leaf spring 32 each of the clamping device 30 can be accommodated. The number of projections 24 or recesses can be chosen freely. In particular, only one projection 24 or recess and therefore only one fixing element 24 can be provided in the coupling section 23.

The number of leaf springs 32 of the clamping device 30 can be chosen as suitable. Also only two leaf springs 32 can be oppositely positioned at the disk 31. Alternatively, also more leaf springs 32 as described in the first example of an embodiment can be provided.

In one modification of the second example of an embodiment the coupling section 25 as fixing element can also feature a projection not shown which protrudes into the hole 42 of the disk 41 of the clamping device 40. Also more than one projection can be disposed.

The number of star prongs of the star 42 of the clamping device 40 can be chosen as suitable. In addition, the shape of the hole 41 can also be chosen as suitable.

The clamping device 30 can also be made of synthetic material instead of metal. In addition, the clamping device 40 can also be made of synthetic material instead of metal.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The invention claimed is:

1. An air filter element for a detachable installation into a housing with a detachable housing cover, the air filter element comprising:
   an airflow permeable tubular support structure having an axially elongated tubular outer wall circumferentially surrounding and defining an axially extending hollow interior, the tubular outer wall having an open grid structure, the open grid structure having a plurality of fluid flow openings extending radially through the tubular support structure from a radially outer surface of the tubular support structure into the axially extending hollow interior;
   a filter medium disposed on and extending circumferentially about said radially outer surface of said tubular support structure and having a first axial end face and an opposing second axial end face;
   wherein the tubular support structure is arranged within an interior of the filter medium and extends between the first axial end and the second axial end within the interior of the filter medium;
   wherein the tubular support structure extends axially from the first axial end to the second axial end of the filter medium within the interior of the filter medium;
   wherein the tubular support structure at its first axial end face extends across the hollow interior of the tubular support structure and having a recessed portion extending inwardly from the first axial end face into the interior of the filter medium, wherein the recessed portion is a coupling section;
   wherein said coupling section engages with a compressibly springy clamping device clamping the air filter element into a direction of a longitudinal axis of the tubular support structure between a housing body and the a housing cover;
   wherein the coupling section comprises
      a fixing element for blocking a rotation of the coupling section and/or of the support structure in relation to the clamping device when the air filter element is detachably installed in the housing;
      wherein the coupling section comprises a fixing element engaging with the clamping device blocking rotation of the coupling section and/or of the support structure in relation to the clamping device when the air filter element is detachably installed into the housing;
   wherein the coupling section features as fixing elements projections between adjacent ones of which one leaf spring each of the clamping device can be accommodated which has at least two pair-wise opposing leaf springs which are disposed at and secured to an outer circumference of a disk.

2. The air filter element according to claim 1, wherein the coupling section and/or the shape of the fixing element is adapted to the shape of the clamping device.

3. The air filter element according to claim 1, wherein the coupling section comprises a curved disk which is curved outward in relation to the end face of the support structure.

4. An air filter element for a detachable installation into a housing with a detachable housing cover, the air filter element comprising:
   an airflow permeable tubular support structure having an axially elongated tubular outer wall circumferentially surrounding and defining an axially extending hollow interior, the tubular outer wall having an open grid structure, the open grid structure having a plurality of fluid flow openings extending radially through the tubular support structure from a radially outer surface of the tubular support structure into the axially extending hollow interior;
   a filter medium disposed on and extending circumferentially about said radially outer surface of said tubular support structure and having a first axial end face and an opposing second axial end face;

wherein the tubular support structure is arranged within an interior of the filter medium and extends between the first axial end and the second axial end within the interior of the filter medium;

wherein the tubular support structure extends axially from the first axial end to the second axial end of the filter medium within the interior of the filter medium;

wherein the tubular support structure at its first axial end face extends across the hollow interior of the tubular support structure and having a recessed portion extending inwardly from the first axial end face into the interior of the filter medium, wherein the recessed portion is a coupling section;

wherein said coupling section engages with a compressibly springy clamping device clamping the air filter element into a direction of a longitudinal axis of the tubular support structure between a housing body and the a housing cover;

wherein the coupling section comprises
a fixing element for blocking a rotation of the coupling section and/or of the support structure in relation to the clamping device when the air filter element is detachably installed in the housing;

wherein the coupling section features as fixing elements radially extending recesses into which one leaf spring each of the clamping device can be accommodated which has at least two pair-wise opposing leaf springs which are disposed at and secured to the outer circumference of a disk.

5. An air filter element for a detachable installation into a housing with a detachable housing cover, the air filter element comprising:

an airflow permeable tubular support structure having an axially elongated tubular outer wall circumferentially surrounding and defining an axially extending hollow interior, the tubular outer wall having an open grid structure, the open grid structure having a plurality of fluid flow openings extending radially through the tubular support structure from a radially outer surface of the tubular support structure into the axially extending hollow interior;

a filter medium disposed on and extending circumferentially about said radially outer surface of said tubular support structure and having a first axial end face and an opposing second axial end face;

wherein the tubular support structure is arranged within an interior of the filter medium and extends between the first axial end and the second axial end within the interior of the filter medium;

wherein the tubular support structure extends axially from the first axial end to the second axial end of the filter medium within the interior of the filter medium;

wherein the tubular support structure at its first axial end face extends across the hollow interior of the tubular support structure and having a recessed portion extending inwardly from the first axial end face into the interior of the filter medium, wherein the recessed portion is a coupling section;

wherein said coupling section engages with a compressibly springy clamping device clamping the air filter element into a direction of a longitudinal axis of the tubular support structure between a housing body and the a housing cover;

wherein the coupling section comprises
a fixing element for blocking a rotation of the coupling section and/or of the support structure in relation to the clamping device when the air filter element is detachably installed in the housing;

wherein the coupling section comprises a fixing element engaging with the clamping device blocking rotation of the coupling section and/or of the support structure in relation to the clamping device when the air filter element is detachably installed into the housing;

wherein the coupling section as fixing element features a projection that can be accommodated in and mountably engage into a hole of a disk of the clamping device which comprises a disk spring.

6. A filter assembly comprising:
an air filter element including:
an airflow permeable tubular support structure having an axially elongated tubular outer wall circumferentially surrounding and defining an axially extending hollow interior, the tubular outer wall having an open grid structure, the open grid structure having a plurality of fluid flow openings extending radially through the tubular support structure from a radially outer surface of the tubular support structure into the axially extending hollow interior;

a filter medium disposed on and extending circumferentially about said radially outer surface of said tubular support structure and having a first axial end face and an opposing second axial end face;

wherein the tubular support structure is arranged within an interior of the filter medium and extends between the first axial and the second axial end within the interior of the filter medium;

wherein the tubular support structure extends axially from the first axial end to the second axial end of the filter medium within the interior of the filter medium;

wherein the tubular support structure at its first axial end face extends across the hollow interior of the tubular support structure and having a recessed portion extending inwardly from the first axial end face into the interior of the filter medium, wherein the recessed portion is a coupling section;

wherein said coupling section engages with a compressibly springy clamping device clamping the air filter element into a direction of a longitudinal axis of the tubular support structure between a housing body and the a housing cover;

wherein the coupling section comprises
a fixing element blocking a rotation of the coupling section and/or of the support structure in relation to the clamping device when the air filter element is detachably installed in the housing;

wherein the coupling section comprises a fixing element engaging with the clamping device blocking rotation of the coupling section and/or of the support structure in relation to the clamping device when the air filter element is detachably installed into the housing;

wherein the coupling section features as fixing elements projections between adjacent ones of which one leaf spring each of the clamping device can be accommodated which has at least two pair-wise opposing leaf springs which are disposed at and secured to an outer circumference of a disk; and a filter housing including:
a housing body;
a housing cover detachably secured to the housing body;
a compressibly springy clamping device operable to clamp the air filter element between the housing body and the housing cover;

wherein the clamping device is designed in such a way that it engages into the coupling section clamping the air filter element in the direction of a longitudinal axis of the tubular support structure, and wherein the clamping device cooperates with a fixing element of the coupling section blocking rotation of the coupling section and/or of the support structure in relation to the clamping device when the air filter element is installed detachably in the housing.

7. A method for mounting an air filter element, comprising: providing the air filter element comprising;

an airflow permeable tubular support structure having an axially elongated tubular outer wall circumferentially surrounding and defining an axially extending hollow interior, the tubular outer wall having an open grid structure, the open grid structure having a plurality of fluid flow openings extending radially through the tubular support structure from a radially outer surface of the tubular support structure into the axially extending hollow interior;

a filter medium disposed on and extending circumferentially about said radially outer surface of said tubular support structure and having a first axial end face and an opposing second axial end face;

wherein the tubular support structure is arranged within an interior of the filter medium and extends between the first axial and the second axial end within the interior of the filter medium;

wherein the tubular support structure extends axially from the first axial end to the second axial end of the filter medium within the interior of the filter medium;

wherein the tubular support structure at its first axial end face extends across the hollow interior of the tubular support structure and having a recessed portion extending inwardly from the first axial end face into the interior of the filter medium, wherein the recessed portion is a coupling section;

wherein said coupling section engages with a compressibly springy clamping device clamping the air filter element into a direction of a longitudinal axis of the tubular support structure between a housing body and the a housing cover;

wherein the coupling section comprises
a fixing element blocking a rotation of the coupling section and/or of the support structure in relation to the clamping device when the air filter element is detachably installed in the housing;

wherein the coupling section comprises a fixing element engaging with the clamping device blocking rotation of the coupling section and/or of the support structure in relation to the clamping device when the air filter element is detachably installed into the housing;

wherein the coupling section features as fixing elements projections between adjacent ones of which one leaf spring each of the clamping device can be accommodated which has at least two pair-wise opposing leaf springs which are disposed at and secured to an outer circumference of a disk; and providing the housing comprising;
a housing body;
a housing cover detachably secured to the housing body;
a compressibly springy clamping device operable to clamp the air filter element between the housing body and the housing cover;

wherein the clamping device is designed in such a way that it engages into the coupling section clamping the air filter element in the direction of a longitudinal axis of the tubular support structure, and wherein the clamping device cooperates with a fixing element of the coupling section blocking rotation of the coupling section and/or of the support structure in relation to the clamping device when the air filter element is installed detachably in the housing;

inserting the filter element into an interior of the housing body through an open end of the housing body;

closing over the open end of the housing body with the housing cover;

compressing the clamping device between the housing cover and the filter element, transmitting a force or pressure through the clamping device from the housing cover to the filter element operating to urge or to clamp the filter element against a seal seat arranged in the housing body.

\* \* \* \* \*